United States Patent [19]

Willer et al.

[11] 4,435,660
[45] Mar. 6, 1984

[54] MAGNETO GENERATOR FOR A CONTACTLESS IGNITION SYSTEM

[75] Inventors: Armin Willer, Heilsbronn; Herbert Roderer, Nuremberg, both of Fed. Rep. of Germany

[73] Assignee: Robert Bosch GmbH, Stuttgart, Fed. Rep. of Germany

[21] Appl. No.: 439,313

[22] Filed: Nov. 4, 1982

Related U.S. Application Data

[63] Continuation of Ser. No. 213,646, Dec. 5, 1980, abandoned.

[30] Foreign Application Priority Data

Dec. 20, 1979 [DE] Fed. Rep. of Germany ....... 2951326

[51] Int. Cl.³ ............................................. H02K 39/00
[52] U.S. Cl. .................................. 310/70 R; 310/153
[58] Field of Search ................ 310/153, 70, 70 A, 156

[56] References Cited

U.S. PATENT DOCUMENTS

| | | | |
|---|---|---|---|
| 1,331,998 | 2/1920 | Neuland | 310/153 X |
| 2,101,392 | 12/1937 | Harmon | 310/153 |
| 4,275,322 | 6/1981 | Cavil et al. | 310/70 X |

*Primary Examiner*—Donovan F. Duggan
*Attorney, Agent, or Firm*—Frishauf, Holtz, Goodman & Woodward

[57] ABSTRACT

In order to increase the power output of a magneto generator without causing additional undesired sparks to be generated in the ignition system, a plurality of permanent magnets each having associated pole pieces is arranged around the periphery of a magnet wheel. The ignition armature and at least one additional armature are fixedly mounted so that, during rotation of the wheel, the pole pieces interact with the legs of an E-shaped core in each of the armatures. However, the polarity of the permanent magnets is such that only the first of these magnets causes the generation of a spark in the ignition system. The polarity of the additional permanent magnets is such that no spark is induced when they pass by the ignition armature during rotation of the wheel. Since all three magnets, regardless of the polarity, are active in inducing AC voltages in the auxiliary armature windings, the power output of the latter is increased.

6 Claims, 1 Drawing Figure

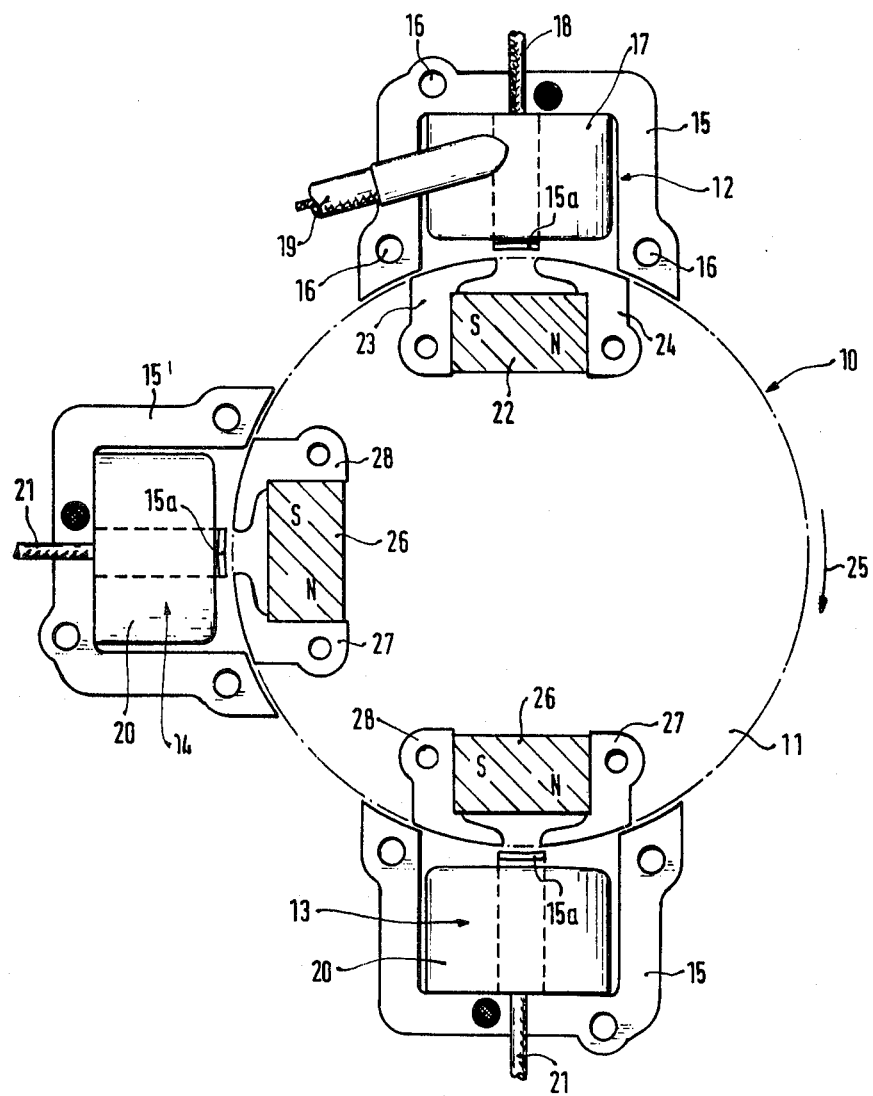

MAGNETO GENERATOR FOR A CONTACTLESS IGNITION SYSTEM

This is a continuation of application Ser. No. 213,646 filed Dec. 5, 1980, now abandoned.

CROSS-REFERENCE TO RELATED APPLICATIONS AND PUBLICATIONS (1) U.S. Ser. No. 821,034 filed 1.05.1969 Based on DE-OS17 63 306;
(2) U.S. Ser. No. 452,360, filed 18.03.1974 Based on German published application DE-OS No. 24 15 465;
(3) DE-OS No. 17 63 306;
(4) DE-OS No. 34 15 465.

All of the above are hereby incorporated by reference into the present application.

The present invention relates to magneto generators and, more particularly, to magneto generators which furnish the excitation for a contactless ignition system in an internal combustion engine.

BACKGROUND AND PRIOR ART

In known magneto generators, a permanent magnet and its pole pieces are cast integral to the rotating magnet wheel (rotor). The pole pieces extend to the periphery of the rotor and magnetically interact with the legs of an armature for a capacitor type ignition system through an air gap (DE-OS No. 17 63 306). The polarity of the permanent magnet and the circuitry of the ignition system is so designed that only when the rotor has the desired direction of rotation is the ignition capacitor charged from a charging coil of the ignition armature and then discharged at the ignition time to generate the spark. The discharge is effected by causing an electrical switch in the discharge circuit of the capacitor to be switched to the conductive state by a control voltage generated in the ignition coil or armature.

An additional armature may readily be added to such a magneto generator if this is required for other electrical loads in the vehicle as, for example, the lighting system or a storage battery.

A magneto generator whose stator has a plurality of windings or coils for separate energization of, on the one hand, the ignition system and, on the other hand, electrical loads, is known from De-OS No. 24 15 465. A rotor having a plurality of pole pairs is provided to increase the output power of the generator. However, such a magneto generator has the disadvantage that increasing the number of pole pairs also increases the frequency of ignition. This is particularly undesirable for one cylinder engines since misfiring will result.

SUMMARY OF THE INVENTION

The advantage of the magneto generator proposed herein is that while two or mre pole pairs may be used, only one will interact with the ignition armature to cause a spark to be generated. For the remaining armatures, electrical energy will be generated in response to all of the pole pairs.

In accordance with the present invention, the rotor carries a first and second permanent magnet. The first magnet is arranged ahead of the second magnet in the direction of rotation of the rotor and has a polarity opposite to that of the second magnet in this direction. A first and second armature are arranged in stationary positions so that they, respectively, react magnetically with the pole pieces of the first and second permanent magnet. The armature which controls the spark in the ignition system is so arranged that a spark is generated only when the first permanent magnet, i.e. a permanent magnet having a predetermined polarity in the direction of rotation, interacts magnetically therewith. The second armature is also fixedly mounted and interacts magnetically with the pole pieces of the first and second permanent magnet to generate electrical energy for a load in the system.

It is a particular advantage of the present system that it is suitable not only for condenser-type ignition systems but may also be used for transistor-controlled systems with additional electrical loads. In other words, it is suitable for any ignition system which may be made sensitive to the polarity of a permanent magnet.

DRAWING ILLUSTRATING A PREFERRED EMBODIMENT

The single FIGURE shows a magneto generator according to the present invention.

DESCRIPTION OF THE PREFFERED EMBODIMENT

In the FIGURE, the magneto generator for a one cylinder internal combustion engine in a farm implement is denoted by reference numeral 10. The magneto generator 10 consists of a magnet wheel (rotor) 11 driven by the internal combustion engine, an ignition armature 12 arranged around the periphery of magnet wheel 11 and two additional armatures 13 and 14. Armatures 12, 13 and 14 each consist of an E-shaped iron core 15, which has a number of mounting bores 16. Armatures 12, 13 and 14 are fastened to the housing in the peripheral region of magnet wheel 40 by screws passing through bores 16. The housing is not illustrated. Ignition armature 12 is a part of a contactless ignition system of the internal combustion engine. The primary and secondary winding 17 of ignition armature 12 are arranged on the central leg 15a of iron core 15. A connecting cable 18 connects the primary winding to the transistor switching circuit controlling the current therethrough, while a cable 19 connects the secondary winding to the spark plug (not shown). A generator winding 20 is wound on the central leg 15a of the iron core of additional armatures 13 and 14. A connecting cable 21 connects generator winding 20 to a storage battery, or to the lighting system of the implement, through rectifier elements. A permanent magnet 22 is embedded in magnet wheel 11 near its periphery. Permanent magnet 22 has two associated pole pieces 23 and 24 which are spaced at a distance from each other in the direction of rotation of wheel 11. In the illustrated case, the left end of permanent magnet 22 is a south pole, while the right end is a north pole. When permanent magnet 22 has this polarity, a spark is generated in the ignition system only when pole pieces 23 and 24 of permanent magnet 22 are moved in the direction of arrow 25 under the ends of the legs of E-shaped core 15 of ignition armature 12. During further rotation of magnet wheel 11, permanent magnet 22 with pole pieces 23 and 24 is also moved past the legs of additional armatures 13 and 14. Therefore, an AC voltage is induced in generator windings 20.

In order to increase substantially the power output of magneto generator 10 in additional armatures 13 and 14, two additional permanent magnets 26 with associated pole pieces 27 and 28 are arranged at the periphery of magnet wheel 11. However, these additional permanent magnets are not to cause the generation of a spark in the ignition system. They therefore have a polarity opposite to that required to effect ignition, i.e., opposite to that of the first permanent magnet 22. Pole pieces 27 and 28 interact with the legs of E-shaped iron core 15 of both the ignition and the additional armatures 12 and 13, but do not initiate a spark. Preferably, the ignition and additional armatures 12 and 13 as well as permanent magnets 22 and 26 are each removed by 90° relative to one another.

Magneto generator 10 is so arranged that, when magnet wheel 11 rotates in the predetermined direction, only the first of the three permanent magnets has a polarity such that when it passes ignition armature 12 a spark will be generated in the ignition system. The two subsequent permanent magnets 26, however, have a polarity which prevents the generation of a spark. Therefore, for each full rotation of magnet wheel 11, only one ignition process is initiated. However, during each rotation of magnet wheel 11. AC voltages are induced by all three permanent magnets 22,26. The voltage induced in each armature is then applied through individual rectifier circuits to the particular load to be supplied.

The invention is not to be limited to the particular embodiment shown in the single FIGURE. For example, additional permanent magnets could be arranged around the periphery of the magnet wheel in order to further increase the power output in the additional armatures. The number of additional armatures can be decreased or increased. Further, a magnet wheel may be disc-shaped as a fan wheel or in the form of bell with pole pieces which extend toward the interior. In the latter case, the ignition armatures as well as the additional armatures are fixedly mounted on a base inside of the fan wheel "bell" and the generator windings could be arranged on a star-shaped iron core.

Magneto generators according to the present invention may be used to advantage whenever an electrical load is present in addition to the ignition system. For example, they may be usefully employed in lawn mowers having electrical starters, and snowmobiles, etc.

Various changes and modifications may be made within the scope of the inventive concepts.

We claim:

1. In an internal combustion engine having a contactless ignition system and an electrical load, a magneto generator comprising:
   a rotor (11) for operation in a single predetermined direction of rotation;
   a first and second (22,26) permanent magnet set in said rotor, spaced apart circumferentially from each other, each having a polarity perpendicular to a radius of said rotor passing through the magnet and each having a magnetic system comprising a first and second pole piece respectively abutting opposite poles of the magnet, said first and second magnets being mounted with opposite polarity with reference to direction of rotation of said rotor;
   a first armature (15) fixedly mounted relative to the path of said first and second permanent magnets for magnetic interaction therewith, and having a winding connected to said ignition system so that a spark is generated only upon said interaction with said first permanent magnet when said rotor is rotating in said single predetermined direction of rotation;
   a third permanent magnet set in said rotor, spaced apart circumferentially from said first and second magnets, having a polarity perpendicular to a radius of said rotor passing through said third magnet, which polarity is the same as that of said second magnet with reference to direction of rotation, said third magnet also having a magnetic system comprising first and second pole pieces respectively abutting opposite poles of said third magnet; and second and third armatures (15',15") spaced apart from said first armature and fixedly mounted relative to the path of said first, second and third permanent magnets for magnetic interaction therewith and for generating electrical energy in response to said magnetic interaction with said first, second and third magnets.

2. A magneto generator as set forth in claim 1, wherein said first second and third armature each comprises an E-shaped iron core having a center leg (15a) and a coil (17,20) arranged on said center leg.

3. A magneto generator as set forth in claim 2, wherein said permanent magnets are rod-shaped magnets.

4. A magneto generator as set forth in claim 3, wherein said first magnet is spaced 90° from said second magnet and said second magnet is spaced 90° from said third magnet in sequence; and
   wherein said first armature is spaced 90° from said second armature and said second armature is spaced 90° from said third armatures.

5. A magneto generator as set forth in claim 1, wherein said rotor has a periphery;
   wherein said first, second and third permanent magnets are arranged along said periphery, said second permanent magnet being spaced 90° from said first, and said third permanent magnet being spaced 90° from said second permanent magnet; and
   wherein said first, second and third armatures are mounted externally to said rotor and along the periphery thereof.

6. In an internal combustion engine having a contactless ignition system and an electrical load, a magneto generator comprising:
   a rotor (11) for operation in a single predetermined direction of rotation;
   a first and second (22,26) rod-shaped permanent magnet set in said rotor, spaced apart substantially 90° from each other in said rotor, each having a polarity lengthwise of its rod shape and perpendicular to a radius of said rotor passing through the magnet, and each having a magnetic circuit system comprising a first and second pole piece abutting the respective end faces of the rod-shaped magnet, said first and second magnets being mounted with opposite polarity with reference to direction of rotation of said rotor;
   a first armature (15) fixedly mounted relative to the path of said first and second permanent magnets for magnetic interaction therewith, and having a winding connected to said ignition system so that a spark is generated only upon said interaction with said first permanent magnet when said rotor is rotating in said single predetermined direction of rotation;
   and a second armature (15') spaced apart substantially 90° from said first armature and fixedly mounted relative to the path of said first and second permanent magnets for magnetic interaction therewith and for generating electrical energy in response to said magnetic interaction with said first and second magnets, said first and second armatures being wound on the respective center legs of E-shaped cores having outer legs disposed for magnetic interaction with said pole piece.

* * * * *